Patented Aug. 21, 1923.

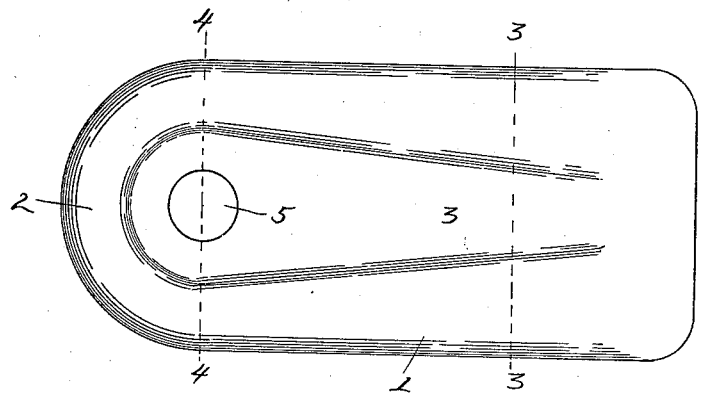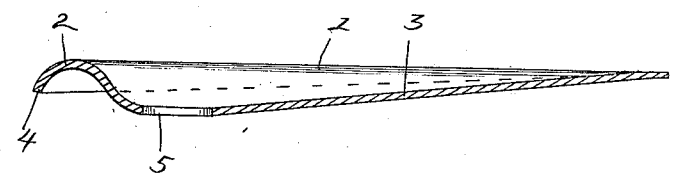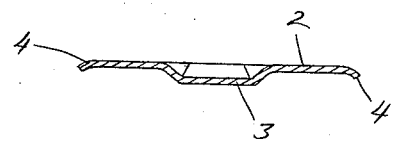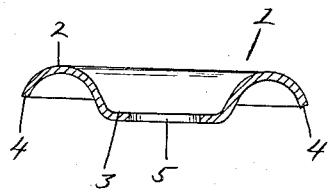

1,465,302

UNITED STATES PATENT OFFICE.

FRED HASKEL, OF DETROIT, MICHIGAN.

WEDGE.

Application filed June 18, 1921. Serial No. 478,622.

*To all whom it may concern:*

Be it known that I, FRED HASKEL, a citizen of the United States of America, residing at Detroit, in the county of Wayne and State of Michigan, have invented certain new and useful Improvements in Wedges, of which the following is a specification, reference being had therein to the accompanying drawings.

The invention relates to wedges which are designed particularly for use in connection with windows or the like to prevent rattling of the same. One of the objects of the invention is to provide a wedge which may be readily formed from a flat blank and has laterally adjacent portions, the bearing portions of which are in diverging planes. Another object is the provision of a wedge, the outer edges of which are between the planes of the bearing surfaces and cannot mar the finish of the members being engaged by the wedge. With these objects in view, the invention resides in the novel features of construction as more fully hereinafter set forth.

In the drawings:

Figure 1 is a plan view of a wedge embodying my invention;

Figures 2, 3 and 4 are cross sections on the lines 2—2, 3—3, 4—4 respectively of Figure 1.

The wedge comprises the side portions 1 connected at their rear ends by the semi-circular end portion 2 and also comprises the depressed intermediate portion 3. The outer or bearing surfaces of the side portion 1 and end portion 2 are in substantially the same plane while the outer or bearing surface of the depressed intermediate portion 3 is in a diverging plane, the forward ends of the side portions and intermediate portion merging into the same plane.

For the purpose of reinforcing the wedge and at the same time preventing the outer edges of the side and rear end portions coming in contact with the members being engaged by the wedge, these outer edges 4 are bent and terminate intermediate the planes of the bearing surfaces of the side portions 1 and intermediate portion 3.

From the above description it will be readily seen that I have provided a simple construction of wedge which may be readily stamped from a flat blank and in which the laterally adjacent portions of the wedge have their bearing faces in diverging planes to secure a wedging action. Furthermore, the outer edges of the side portions terminate between the planes of these bearing surfaces and consequently are prevented from contacting with the members engaged and marring the surfaces of the same. When the wedge is not in use, it may be suspended by means of a nail or the like engaging in the aperture 5 in the rear end of the depressed intermediate portion 3.

What I claim as my invention is:

1. A wedge formed from a flat blank, comprising curved side portions with their bearing surfaces in substantially the same plane, and an intermediate depressed portion with its bearing surface in a plane diverging from said first-mentioned plane, said side portions having bent side edges terminating intermediate the planes of said bearing surfaces.

2. A wedge stamped from a flat blank, comprising side portions and a semi-circular end portion connecting the rear ends of said side portions, said side and end portions having their bearing surfaces in substantially the same plane, and an intermediate depressed portion merging into the front ends of said side portions and having its bearing surface in a plane diverging from said first-mentioned plane, said side and end portions having outer bent edges terminating intermediate the planes of said bearing surfaces.

3. A wedge formed from a single piece of material comprising curved side portions with bearing surfaces in substantially the same plane, a curved end portion connecting the rear ends of said side portions having a bearing surface disposed in a different plane, and a depressed intermediate portion, the forward ends of said side portions and intermediate portion merging into the same plane.

4. A wedge formed from a flat blank comprising curved side portions with bearing surfaces in substantially the same plane, and a flat intermediate depressed portion having a bearing surface disposed in a diverging plane.

5. A wedge formed from a flat blank comprising curved side portions with bearing surfaces in substantially the same plane, and an intermediate depressed portion, said intermediate portion having a bearing surface in a different plane, the forward ends of said side portions and said intermediate portion merging into the same plane.

In testimony whereof I affix my signature.

FRED HASKEL.